United States Patent [19]

Cox et al.

[11] Patent Number: 4,584,002

[45] Date of Patent: Apr. 22, 1986

[54] RECIRCULATING FOAM GENERATOR

[75] Inventors: Bruce M. Cox; William W. Pattison, Jr., both of Duncan, Okla.

[73] Assignee: Halliburton Company, Duncan, Okla.

[21] Appl. No.: 276,218

[22] Filed: Jun. 22, 1981

[51] Int. Cl.[4] .................................... C09B 3/60

[52] U.S. Cl. .................................... 55/257 PP; 55/87; 261/DIG. 26; 366/137

[58] Field of Search .................... 252/359 R, 359 E; 261/DIG. 26; 159/DIG. 4; 366/604, 137; 55/257 PP

[56] References Cited

U.S. PATENT DOCUMENTS

| | | | |
|---|---|---|---|
| 1,753,429 | 4/1930 | Rice | 252/359 E |
| 2,418,858 | 4/1947 | Urquhart | 261/DIG. 26 |
| 3,263,336 | 8/1966 | Sjogren | 159/DIG. 4 |
| 3,979,326 | 9/1976 | Chatterton | 252/359 E |
| 4,027,993 | 6/1977 | Wolff | 261/DIG. 26 |
| 4,070,302 | 1/1978 | Chatterton | 252/359 E |

FOREIGN PATENT DOCUMENTS

| | | | |
|---|---|---|---|
| 43871 | 1/1974 | Australia | 252/359 R |

*Primary Examiner*—Peter Kratz

*Attorney, Agent, or Firm*—Joseph A. Walkowski; Thomas R. Weaver

[57] ABSTRACT

The present invention relates to a method and apparatus for enhancing the quality of a foam, such as may be employed in industrial cleaning operations, petroleum well servicing operations, and the like. Foam from a foam generator is introduced into a foam separator comprising a pressure vessel, preferably having an apertured horizontal separator plate therein, a discharge line at the top thereof, and a drain line at the bottom thereof. As foam enters the separator, the foam will pass upward through the apertured separator plate, any liquid remaining below. The liquid then enters the drain line and is reinjected into the liquid line feeding the foam generator, preferably by use of an eductor. The foam is removed from the separator through the discharge line, and put to its intended use.

9 Claims, 1 Drawing Figure

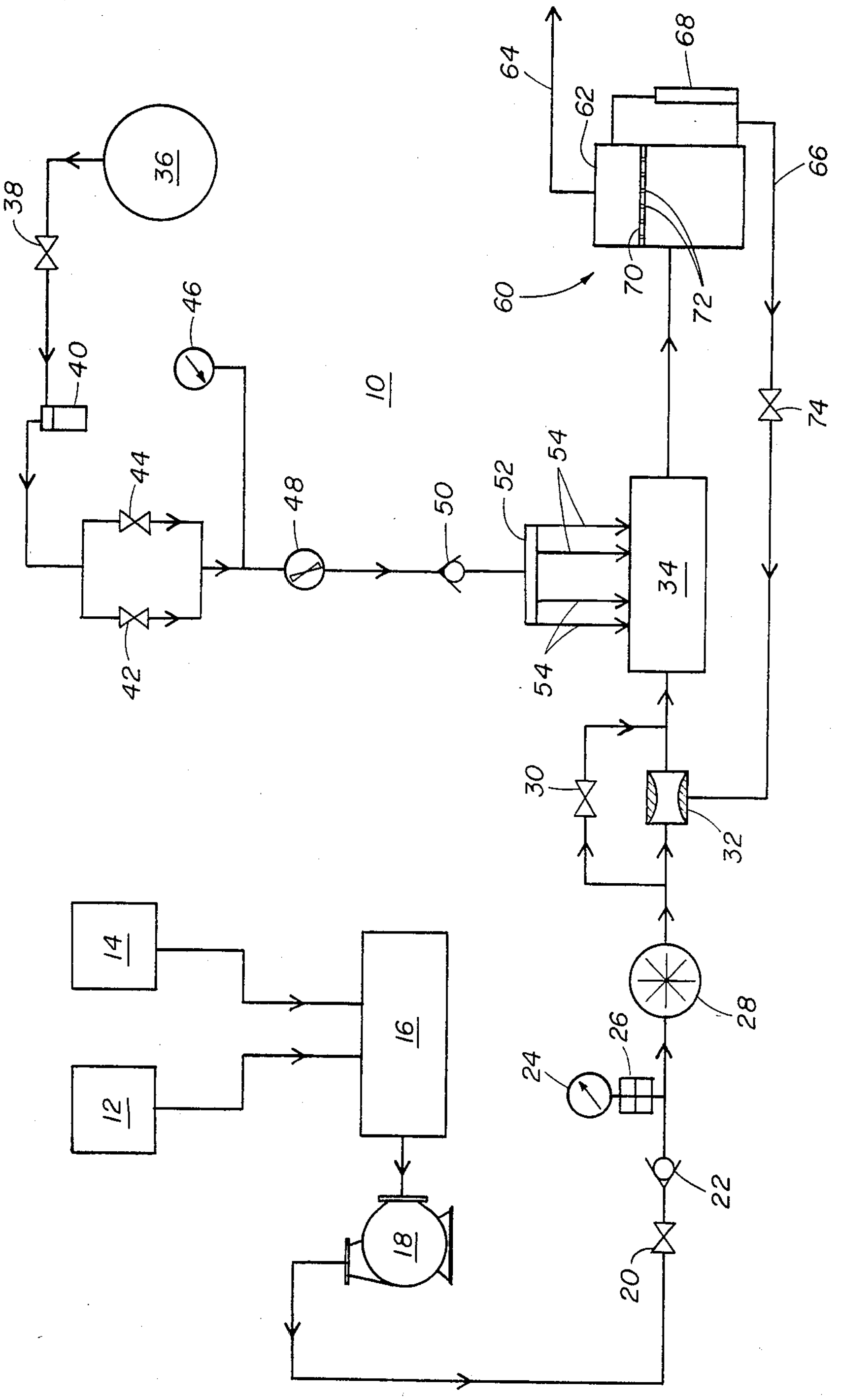
10
12
14
16
18
20
22
24
26
28
30
32
34
36
38
40
42
44
46
48
50
52
54
60
62
64
66
68
70
72
74

RECIRCULATING FOAM GENERATOR

BACKGROUND OF THE INVENTION

The use of foamed liquids has become increasingly important in a number of industrial fields, among them the cleaning of condensers, heat exchangers, storage tanks, and other large-volume vessels employed in power generators, chemical processing, petroleum refining, and other industries. This phenomenon is due in part to the rising costs of the liquids employed in such cleaning, and in part to the increasingly difficult problems encountered in disposing of large volumes of such liquids after the cleaning operation has been completed. In addition, many devices cannot be cleaned with a liquid as they are not structurally capable of bearing its weight. Additionally, foams have become important in petroleum well stimulation and fracturing. The use of a foam rather than a liquid in the latter applications requires less pumping capacity for the high pressure injection of the well treatment fluid, and lessens the possibility of formation damage, particularly in natural gas wells. As with industrial cleaning operations, the cost of the treatment fluids and fluid disposal problems after treatment increase the attractiveness of employing foams.

One of the major problems encountered in using foam for the above referenced and other applications is the difficulty of producing a substantially uniform foam without slugs of liquid or gas emulsion therein which lessen the stability and quality of the foam. Ideally, a foam has a uniform dispersion of fine gas bubbles in a relatively small volume of liquid. As the volume of liquid increases with respect to the volume of gas, the gas bubbles become spaced farther apart, resulting initially in a low stability foam, and, as the liquid to gas ratio is further increased, a gas emulsion results, having little or no structural stability. On the other hand, as the gas volume is increased with respect to the liquid volume, the crowding of the gas bubbles together results in deformation of the bubbles and an increase in the rigidity and therefore structural stability of the foam.

Prior to the present invention, there has been no way to reliably ensure, when producing large volumes of foam, that liquids and gas emulsions do not pervade the foam product, lowering its stability and hence its utility.

SUMMARY OF THE INVENTION

The present invention comprises a method and apparatus for enhancing the quality of a foam through the separation of substantially all liquid and gas emulsion products from the foam prior to its intended use. Foam from a foam generator, such as is known in the art, is introduced into a foam separator comprising a pressure vessel, having a separator plate with apertures therein, a discharge line at the top thereof, and a drain line at the bottom thereof. As the foam fills the separator, it will extrude upward through the apertures in the separator plate, its structural integrity maintaining it above the plate by bridging the apertures therein, while liquids and gas emulsions in the separator will remain below the plate. The foam above the separator plate is removed from the pressure vessel through the discharge line, and the liquid and/or gas emulsion is removed from the separator through the drain line and injected into the liquid feed line for the foam generator, preferably by use of an eductor. The injection of the liquid and gas emulsion creates turbulence in the feed line, rendering the mixture more susceptible to foaming in the foam generator, thus further enhancing the quality of the foam. Use of an eductor for injection of the liquid and gas emulsion eliminates the requirement for a pump, as well as enhancing turbulence at the injection point.

BRIEF DESCRIPTION OF THE DRAWING

The method and apparatus of the present invention is described in greater detail in the following specification, wherein reference is made to the accompanying drawing figure, a schematic representation of the apparatus employed in the present invention.

DETAILED DESCRIPTION OF THE PREFERRED EMBODIMENT

Referring now to the attached drawing figure, a method and apparatus for enhancing the quality of a foam is described hereafter in detail.

It is possible to describe the quality of a foam in terms of percentages of gaseous and liquid components. In other words, a 70 quality foam is seventy percent gas component, an 80 quality foam is eighty percent gas component, etc. It is desirable to achieve at least an 80 quality foam, such a foam generally possessing good stability. Lower quality foams, such as 50, 60 or 70 quality, do not possess enough gas component to make the foam normally self-supporting, as the bubbles are not close enough together to form a relatively rigid matrix. Such a foam will usually rapidly degenerate into a gas emulsion. In laboratory tests, achieving a high foam quality is not difficult, as the liquid and gas volumes, pressures and flow rates can be precisely controlled, and the relatively small volumes of foam to be generated permit easy and thorough mixing of the liquid components employed. However, in commercial foaming operations, in which hundreds to hundreds of thousands of gallons of foam must be generated, maintenance of high quality foam generation is a significant problem. Liquid pumping rates are difficult to control precisely in large volume applications, and may vary from minute to minute. In addition, proportions of various liquid components may vary between tanks, or even within a large tank. Gas pressures may vary during an operation, such variation being beyond the control of the operator in many instances, such as where a compressed air supply from a line on which there are other users must be employed. Thus, while a high quality foam may be generated a large part of the time, variations in liquid component composition, gas and liquid flow rates and pressures in the generation system tend to produce slugs of low quality foam, gas emulsion, or in extreme cases, even liquid, along with the high quality, high stability foam. It is, of course necessary to remove such objectionable products before the foam is put to its intended use in order to achieve maximum benefit. For example and not by way of limitation, in acid cleaning of a large volume tank, condenser or heat exchanger, liquid or gas emulsion in the foam will rapidly settle to the bottom of the vessel, giving uneven cleaning to that portion, and possibly resulting in corrosion damage if the surface contact time is too great. In addition, the presence of too much liquid in the foam lowers its stability, and prevents it from filling large vessels as it collapses under its own weight before reaching the top. The present invention greatly reduces the incidence of these unwarranted results, even in large-scale operations.

Foam generation system 10 comprises a liquid source or sources 12 and an additive source or sources 14, from which liquids and additives are pre-mixed in blender tank 16, until they are drawn therefrom by injection pump 18. Valve 20 is employed to more precisely control the liquid flow rate, check valve 22 preventing back flow in the event injection pump 18 is stopped. Pressure gauge 24, isolated from the liquid line by gauge protector 26, monitors line pressure. Turbine flow meter 28 is employed to gauge liquid flow rate. In parallel, downstream from flowmeter 28, are valve 30 and eductor 32, which lead to the liquid lead line input of foam generator 34. A gas source, generally designated by numeral 36, may be tank gas, vaporized gas from a liquified gas source, a line source from a plant, a gas generator, or any other suitable source. Valve 38 adjusts the initial gas flow to filter 40, after which the gas line splits to parallel lines in which needle valves 42 and 44 are located for fine adjustment. Pressure gauge 46 is employed to monitor pressure on the gas feed line, while turbine flowmeter 48 monitors volume flow. Check valve 50 prevents back flow from foam generator 34 in the event there is a stoppage in the gas supply, or severe leakage or blowout in the system upstream of the foam generator. Downstream of check valve 50, the gas feed line enters manifold 52, from which injection lines 54 introduce gas into foam generator 34. Foam generator 34 may be of the type in which gas is injected tangentially to a liquid stream, in the center thereof, or at the same point as the liquid, the exact type of foam generator not being germaine to the understanding or operation of the method and apparatus of the present invention.

Foam from foam generator 34 enters foam separator 60, comprising pressure vessel 62, discharge line 64, drain line 66, sight glass 68 and separator plate 70. Discharge line 64 leads to the intended use for the foam while drain line 66 leads to eductor 32, valve 74 being used to adjust the flow thereto. Separator plate 70 within pressure vessel 62 possesses a large plurality of apertures 72 therein. In this illustration, an aperture size of one-quarter of an inch is employed, although larger or smaller apertures may be employed depending upon the weight of the foam, as will be described hereafter.

In operation, foam generation proceeds as follows. The liquid and gas components for the foam are introduced into foam generator 34, component pressures and temperatures being monitored by the aforementioned meters and gauges, the data therefrom being monitored manually or through the use of electronic readouts, analyzers and totalizers, or microprocessor-based control systems, all of which are commercially available. Gas feed is preferably initiated before liquid feed, so as to avoid filling the foam separator 60 with liquid at the commencement of the foaming operation. Gas feed is finely adjusted through needle valves 42 and 44, which may be of different sizes to facilitate greater precision of adjustment. Liquid feed from blender tank 16 is then initiated and adjusted through valve 20, being preferably routed through eductor 32 unless the flow rate exceeds the eductor's capacity, in which case part of the liquid is bypassed through parallel valve 30. As the liquid and gas components are contacted in foam generator 34, preferably with some degree of turbulent flow to enhance mixing, a foam results through the process of dispersion.

As stated previously, due to variations in liquid composition, and liquid and gas pressure and flow, the desired foam quality (for purposes of example, 80 quality) may only be achieved part of the time by the foam generator. Foam separator 60 is thus employed to remove undesirable elements in the foam created by the aforesaid variables. As the foam enters pressure vessel 62, it rapidly fills the available volume below separator plate 70. High quality, high stability foam will tend to remain on top of the mixture in pressure vessel 60, with low quality, unstable foam below it, followed by gas emulsion and liquid at the bottom. The high quality foam is the only foam component with appreciable structural stability, but not enough to prevent the other, heavier low quality foam, emulsion and liquid components from passing through it. Thus, the heavier components settle, while the high quality foam is self-supporting. As the volume of the high quality foam increases, it will extrude through the apertures 72 in separator plate 70, rejoin itself after extrusion, and resist downward penetration through the apertures by its tendency to bridge thereacross. Sight glass 68 is employed to ascertain the liquid and/or gas emulsion level in the vessel 60, to ensure that it does not exceed the height of separator plate 70. As the liquid level rises, it is bled off through drain line 66 to the generator liquid feed line through the operation of valve 74. As the preferred liquid feed line injection device for the discharge from foam separator 60 is an eductor, which pulls liquid from drain line 66 into the generator's liquid feed line by the pressure differential created by the flow from the liquid feed line through the eductor, no pump is necessary for the separator discharge liquid and the system is thus simplified. In addition, use of an eductor creates turbulence at the discharge liquid injection point, enhancing the liquid's tendency to foam as it enters foam generator 34. The gas present in the injected discharge liquid also enhances the liquid's foaming tendencies as it increases contact time between the liquid and gas components, and forms the beginning of a gas/liquid matrix to be completed as additional gas is introduced in foam generator 34.

In the foam generator depicted, aperture sizes of one-quarter inch were employed. However, aperture sizing may be adjusted depending on various factors such as fineness and weight of the foam. For example, an extremely heavy, coarse foam might require extremely small apertures, as its ability to support its own weight and bridge an aperture is limited. Conversely, a very light fine foam might indicate extremely large apertures, or even a grill, in lieu of a plate with apertures, as its structural stability and rigidity is great with respect to its weight. Apertures need not be round, nor is their spacing critical. Of course, use of an extremely small number of apertures in the separator plate may cause a pressure increase in the vessel chamber area below the plate, thus causing the foam to collapse into its liquid and gas components. Aperture spacing is likewise not critical, but a substantially uniform aperture spacing is preferred to avoid pressure differentials on the same side of the separator plate and to ensure a substantially uniform extrusion rate.

The entry line for the gas separator 60 is shown as being below the level of separator plate 70. This is to ensure that only high quality foam exists above the separator plate 70. To place the feed line above the separator plate 70 would be possible, but would have the undesirable effect of contaminating high quality foam in the upper chamber with liquid, gas emulsion and low-stability foam. Thus, it is preferable to keep the entry line below the separator plate.

Line and pump sizes, valve types and sizes and gauge and meter sizes have been omitted from the example, their choice being dependent on pressures and flow rates employed, and being well within the ability of one of ordinary skill in the art.

By way of illustration and not by way of limitation, an example of foam generation employing the disclosed apparatus and method is described hereafter. An acidic solvent solution, such as might be employed in an industrial cleaning operation, was prepared in the following proportions:

500 gallons 10% HCl acid 20 gallons ethoxylated amine salt gelling agent 2.5 gallons short chain nonionic ethoxylated amine surface active agent (surfactant)

1.0 gallons Rodine 213 acid inhibitor

Rodine 213 is a product of American Chemical Products. The 10% HCl acid solution was prepared by diluting 22° Be HCl with water to the desired concentration and volume. The inhibitor was then added and mixing commenced, after which the gelling agent was slowly added mixing being continued during its addition and thereafter. Subsequently, the surfactant was added to the solution, which was then foamed. Liquid flow rates were varied from 10 gallons per minute and 100 gallons per minute. Nitrogen at 150 PSI maximum pressure was used to foam the liquid, flow rates being varied from 3 to 55 ACFM in conjunction with those of the liquid. A good, fine-textured 80 quality foam was produced at a rate of 50 to 500 gallons per minute, there being no evidence of free liquid in the foam taken from the discharge line of the foam separator.

While an exemplary foaming operation has been described employing HCl, it should be understood that the apparatus and method described herein may be utilized to foam $H_2SO_4$, formic acid, trisodiumphosphate, $Na_2CO_3$, NaOH, HCOOH and many other solutions, water or oil-based.

It may thus be appreciated that the method and apparatus of the present invention greatly enhances the quality of generated foam by removing undesirable non-stable foam products from the desired high-quality uniform foam prior to its intended use.

While the method and aparatus of the present invention have been described in terms of a preferred embodiment, it should be understood that additions, deletions and modifications thereto will be apparent to one of ordinary skill in the art. For example, two eductors may be employed in the liquid feed line, so as to eliminate the use of a bypass valve. An automatic sensor may be used to ascertain liquid level in the foam separator and open the separator drain line at a certain liquid level. A pump may be used in lieu of an eductor to inject the discharge liquid. As noted above, separator plate aperture configurations may be varied. A separator with more than one separator plate may be employed. A non-horizontal separator plate, a cone-shaped, a bowl-shaped or other separator plate configurations may be utilized to increase the extrusion area for the foam. The low quality foam products in the drain line of the separator may be injected directly into the generator, rather than the liquid inlet line. These and other modifications are contemplated, without departing from the spirit and scope of the claimed invention.

We claim:

1. Apparatus for enhancing the quality of a foam product generated by a foam generator comprising, in combination with a foam generator:

a foam separator adapted to remove liquid and low-quality foam components from a foam product introduced therein, said foam separator including a pressure vessel having apertured separator plate means therein, a foam product inlet line to said pressure vessel, a high-quality foam discharge line from said pressure vessel, and a drain line from said pressure vessel; and injection means on a liquid inlet line of said foam generator, said drain line leading to said injection means.

2. The apparatus of claim 1, wherein said high-quality foam discharge line is located above said separator plate means, said foam product inlet line is located below said separator plate means, and said drain line is located below said foam product inlet line.

3. The apparatus of claim 1, wherein said drain line possesses flow adjustment means associated therewith.

4. The apparatus of claim 1, wherein said injection means comprises at least one eductor.

5. The apparatus of claim 4, wherein said at least one eductor comprises a plurality of eductors.

6. The apparatus of claims 4 or 5, further comprising flow adjustment means associated with said drain line.

7. The apparatus of claim 1, wherein said injection means comprises a pump.

8. The apparatus of claim 7, wherein said pump is a variable flow rate pump.

9. The apparatus of claim 7, further comprising flow rate adjustment means on said drain line.

* * * * *